(12) United States Patent
Barker

(10) Patent No.: US 6,504,792 B2
(45) Date of Patent: Jan. 7, 2003

(54) METHOD AND SYSTEM FOR DEPLOYING AND RECOVERING SEISMIC STREAMERS IN A MARINE SEISMIC ARRAY

(75) Inventor: Glen P. Barker, Friendswood, TX (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 09/726,631

(22) Filed: Nov. 30, 2000

(65) Prior Publication Data

US 2002/0064088 A1 May 30, 2002

(51) Int. Cl.$^7$ .................................................. G01V 1/38
(52) U.S. Cl. ............................................. 367/20; 367/17
(58) Field of Search ........................... 367/15–20, 153, 367/159, 191; 114/242, 252, 243, 253

(56) References Cited

U.S. PATENT DOCUMENTS

| 3,568,623 A | * | 3/1971 | Gustavson, et al. | 114/242 |
| 4,574,723 A | * | 3/1986 | Chiles et al. | 114/253 |
| 5,913,280 A | * | 6/1999 | Nielsen et al. | 114/242 |
| 6,028,817 A | * | 2/2000 | Ambs | 367/16 |

FOREIGN PATENT DOCUMENTS

WO 01/16623 * 8/2001 ............ G01V/1/38

OTHER PUBLICATIONS

International Search Report dated Apr. 24, 2002 for International application no. PCT/US01/48748 Filed Nov. 29, 2001.*

* cited by examiner

*Primary Examiner*—Edward Lefkowitz
*Assistant Examiner*—Anthony Gutierrez
(74) *Attorney, Agent, or Firm*—David S. Figatner; Williams, Morgan & Amerson, P.C.

(57) ABSTRACT

A system and method for deploying and retrieving streamers behind a tow vessel in a marine seismic array. Each streamer and attached lead-in cable are individually deployed and retrieved into and from the array, and are connected to adjacent lead-in cables with tag lines having a slidable latch mechanism attached to one or more ends of the tag lines. Each latch mechanism is slidable along a lead-in cable until is engages a tether head at a selected location which restricts further movement. Paravanes move the attached array transversely from the centerline of the vessel movement and retain tension on the tag lines. The system uniquely permits retrieval of a single lead-in cable and attached streamer without requiring retrieval of the entire seismic array.

19 Claims, 3 Drawing Sheets

METHOD AND SYSTEM FOR DEPLOYING AND RECOVERING SEISMIC STREAMERS IN A MARINE SEISMIC ARRAY

BACKGROUND OF THE INVENTION

The invention relates to the field of marine seismic exploration. More particularly, the invention relates to an improved system and method for connecting marine seismic streamer cables towed behind a vessel.

Seismic sources and acoustic energy sensing hydrophones are deployed behind seismic vessels to survey the subsurface geologic formations underlying water. The seismic sources produce acoustic energy propagated into subsurface geologic formations, and acoustic energy is reflected upwardly as acoustic waves detectable by the hydrophones.

Seismic streamers comprise hydrophones, electronic modules, electrical wires, and sensors. Seismic streamers are typically thousands of meters long and are positioned at selected cross offsets. Multiple streamers are towed in a seismic array through the water, and the outer streamers are offset from the vessel centerline with paravanes and other diverter systems. Lead-in cables connect the streamers to the tow vessel, and various techniques maintain constant spacing between adjacent streamers.

Tether points are linked as the lead-in cable leaves the tow vessel back deck and are reeled out together behind the tow vessel. During this reeling operation, attached paravanes progressively move the outer tether points further away from the tow vessel line of travel. Early in such deployment, the cables can become entangled and create a spaghetti type effect behind the tow vessel. This can occur as several kilometers of streamer cable flow in the water behind the tether point.

Two common methods are used in the deployment and tow of a marine streamer array. One conventional method uses rolling blocks or sheaves to travel down a divertor tow wire while attached to a streamer cable. Another method utilizes a cross-tag line to position the streamer cables at a predetermined spacing. The cross-tag lines are shackled from one cable to another during deployment and during production. If one cable needs to be retrieved, all of the other cross-tag shackled cables must be retrieved. This relationship creates problems when multiple cables are retrieved or deployed with narrow spacing therebetween.

Various tackle systems have been developed for marine two operations. U.S. Pat. No. 3,568,623 to Gustavson et al. (1971) disclosed a tow tackle having a hinged wedge attachable to a slotted skirt. U.S. Pat. No. 4,574,723 to Chiles et al. (1986) disclosed a hitch device for permitting horizontal deployment of a paravane before the paravane is rotated to the vertical operating orientation. U.S. Pat. No. 5,408,947 to Curto et al. (1995) disclosed a removable towing bracket having pivoting arms for connection with a streamer cable lead-in.

U.S. Pat. No. 6,074,253 to Brinchmann-Hansen (2000) disclosed a device for connecting a seismic streamer to a lead-in cable. The device established electrical connection between the streamer and lead-in cable while reducing drag induced by water resistance as the cables were towed through the water.

A paravane handling system was disclosed in U.S. Pat. No. 4,574,723 to Chiles et al. (1986), wherein a paravane and hitching device were tethered to a main line. A latching mechanism was slidable along the main line to selectively engage and disengage the hitching device.

A need exists for improved systems and techniques for deploying and recovering seismic streamers in a marine seismic array. The system should be economic and should minimize water resistance as the seismic equipment is towed through water.

SUMMARY OF THE INVENTION

The invention provides a system and method for deploying at least two seismic streamers behind a tow vessel movable in a selected course through water. The system comprises a first cable having a first end attachable to a first seismic streamer and having a second end engaged with the vessel, a second cable having a first end attachable to a second seismic streamer and having a second end engaged with the vessel, a latch associated with the first cable, a tag line having a first end and having a second end connected with the second cable, wherein the tag line first end is slidable along the first cable until the tag line first end contacts the latch, and a diverter connected to the first cable first end for urging the first seismic streamer to a position offset from the vessel course and for maintaining tension in the tag line for controlling the distance between the first seismic streamer and the second seismic streamer.

The method of the invention comprises the steps of attaching a divertor to a first cable having an end engaged with the tow vessel and having a latch attached to the first cable, of deploying the divertor and first cable into the water, of engaging the first end of a tag line to the first cable, wherein said tag line has a second end connected with a second cable, of deploying the tag line and second cable into the water, wherein the tag line first end is slidable along the first cable, of adjusting the length of the second cable until the tag line first end contacts the latch, and of moving the tow vessel to pull the divertor and first and second cables through the water.

DESCRIPTION OF THE PREFERRED EMBODIMENTS

Figure 1:
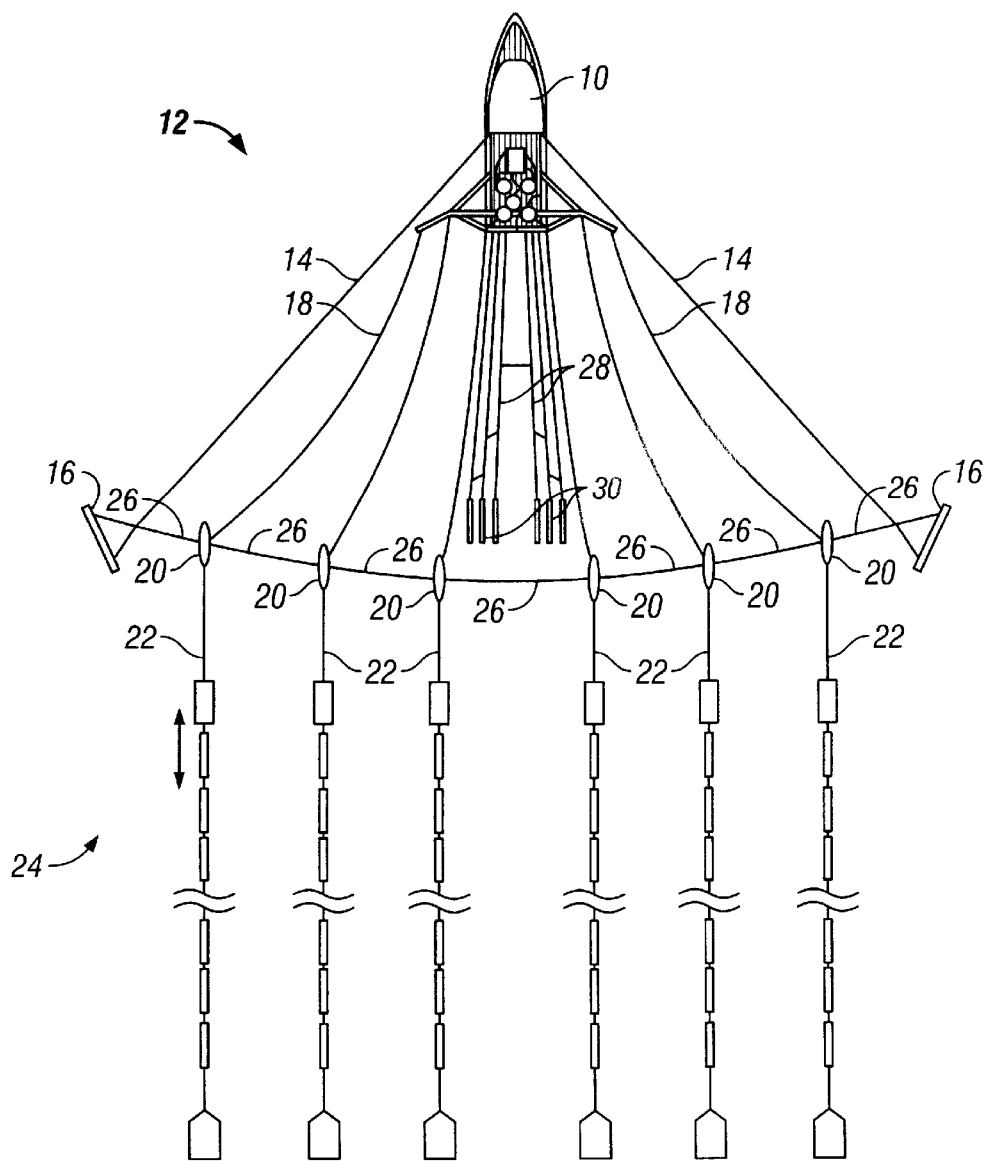
FIG. 1 illustrates deployment of seismic cables behind a tow vessel.

The invention provides a system and method for connecting seismic cables in a marine seismic array. FIG. 1 illustrates one embodiment of the invention wherein tow vessel 10 travels through water 12. Tow cables 14 are attached to vessel 10 for towing paravanes 16. Lead-in cables 18 have one end attached to vessel 10 and another end connected to floats 20. Each float 20 is attached to a corresponding seismic streamer 22 trailing behind vessel 10 in a marine seismic array 24. Cross tag lines 26 are engaged between lead-in cables 18 and maintain a selected distance between adjacent floats 20. Paravanes 16 maintain a force transverse to the centerline of vessel 10 and prevent tag lines 26 from slackening. Tow cables 28 are connected to vessel 10 and to acoustic energy sources 30 within seismic array 24.

Figure 2:
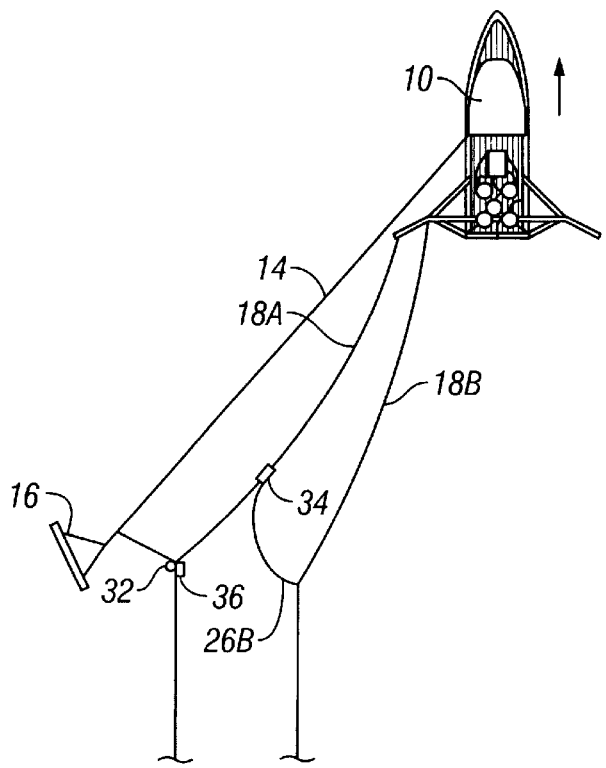
FIGS. 2 and 3 illustrate sequential steps for moving a tag line along a cable until the tag line contacts a latch engaged with another cable.
Figure 3:
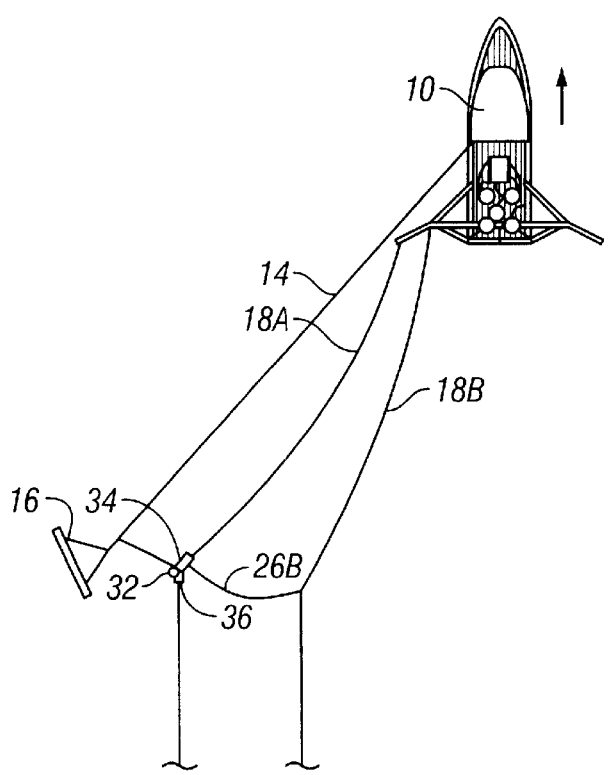

Referring to FIGS. 2 and 3, detail for cross tag line 26 connectors are illustrated. Lead-in cable 18A is connected with tag line 26A to tow cable 14, and tether head 32 connects tag line 26A with lead-in cable 18A. Slidable latch mechanism 34 is connected to lead-in cable 18B which in turn has another end connected to tag line 26B. All tether points are linked as lead-in cables 18 are deployed from vessel 10. As tag line 26B is reeled out from a spool or other device on vessel 10, latch mechanism 34 slides in translation relative to tag line 26A until latch mechanism 34 contacts and engages tether head 32 as illustrated in FIG. 3.

"Engagement" between latch mechanism 34 and tether head 32 can comprise a locked connection or other relationship. Alternatively, "engagement" can comprise an abutting configuration limiting longitudinal movement beyond a selected position and limiting transverse movement between adjacent lead-in cables. Many different device shapes and configurations such as hooks, docking cones, clasps, tapered friction grips, and other devices can be used to accomplish these functional tasks. Such engagement permits full tow force to be transferred from vessel 10 to each lead-in cable 18. In this relationship, transverse forces exerted by paravane 16 maintain tautness in tag lines 26A and B in a direction at least partially offset from the tow path as tow cable 14 and lead-in cables 18A and B are towed through water 12. Paravane 16 progressively moves the outer points further and further out from the centerline of vessel 10 travel until the limit of such travel is constrained, or paravane is operated to adjust the heading and associated travel through water 12. Such relationship also maintains a uniform relative spacing between the terminal ends of lead-in cables 18a and B.

Figure 4:
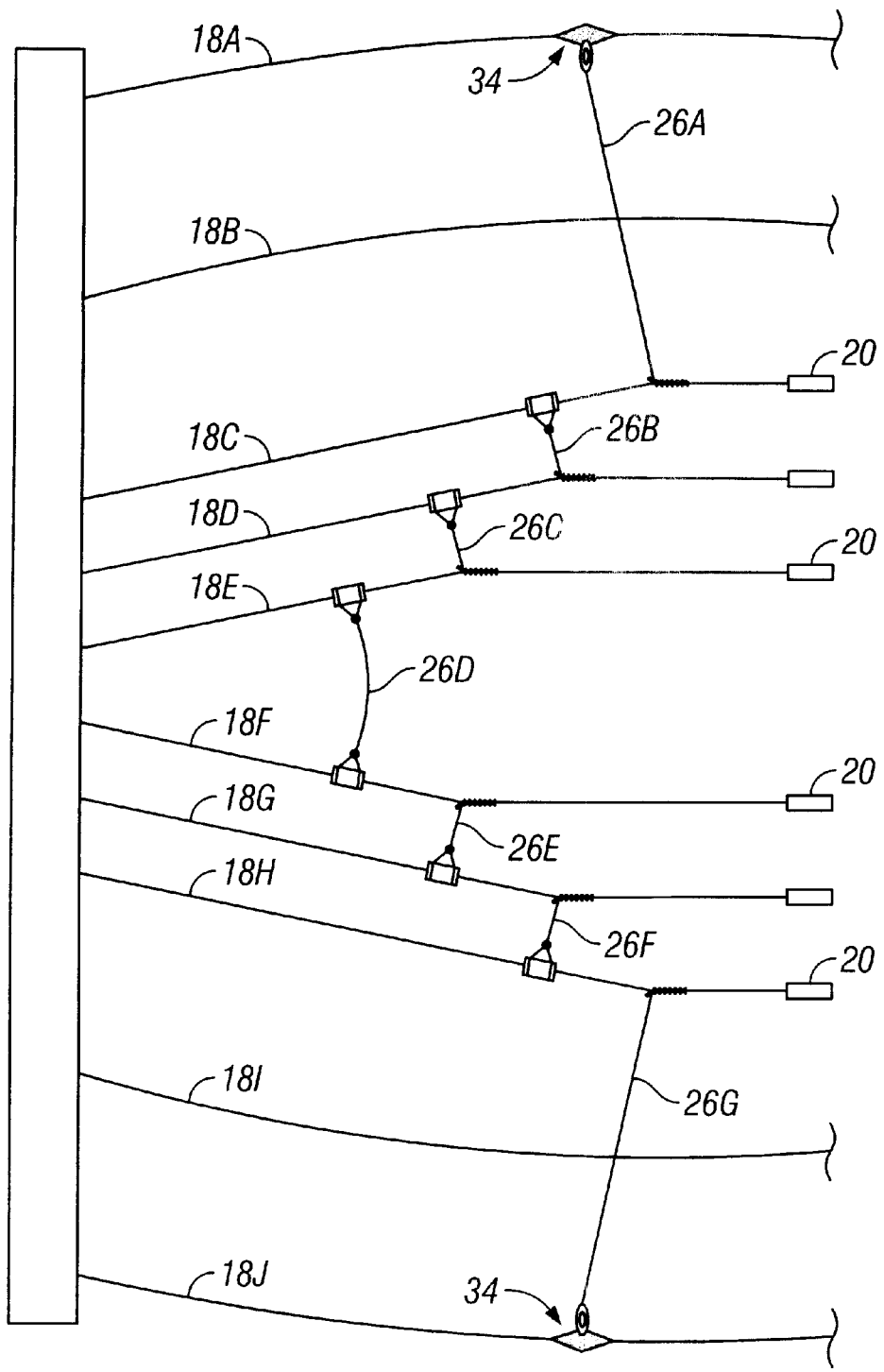
FIG. 4 illustrates a marine seismic array having multiple cables and streamers maintained by two divertors.

This operation can be repeated for other lead-in cables 18 until all of the required lead-in cables 18 and streamers 22 are deployed. This method significantly reduces the risk of entanglement between lead-in cables 18 or streamers 22. An opposing divertor and associated cables 18 and tag lines 26 can be placed on the other side of vessel 10 to complete an array balanced on both sides of vessel 10 as shown in FIG. 4. Another tag line 26 can be connected between the opposing array sections to form a unified marine seismic array.

To retrieve lead-in cable 18B, latch mechanism 34 is disengaged from tether head 32 and lead-in cable 18B is reeled in by vessel 10. Latch mechanism 34 slides along lead-in cable 18A until latch mechanism 34 reaches vessel 10 and is removed from such sliding engagement. Such retrieval capability permits lead-in cable 18A to remain in water 12. In other variations of the invention, the connections between tag line 26 and cables 18 can be configured so that line 18A is removable from water 12 while leaving cable 18B in water 12.

One sequence of cable deployment is described as follows. Tow cable 14 and attached paravane 16 are deployed in water 12 on the port or starboard side of vessel 10 as vessel 10 is moved through water 12. Paravane 16 is moved to a point between 50 and 100 meters behind vessel 10 and tag line 26A is attached to tow cable 14 and to lead-in cable 18A. Tow cable 14 and lead-in cable 18A are further deployed approximately 100 meters behind vessel 10 and tag line 26B is attached to lead-in cables 18A and 18B. As tow cable 14 and lead-in cables 18 are deployed, paravane 16 urges the linked array transversely outwardly from the centerline travel of vessel 10. Cross-line tags 26 can be of a selected length or lengths and typically position adjacent lead-in cables 18 at one hundred meter intervals in a symmetrical array 24.

This process can be repeated until the selected number of lead-in cables 18 are trailing behind vessel 10 on one side of the array 24. This process can be repeated on the other side of vessel 10 to complete both sides of array 24. Both sides can be connected with a single tag line 26 connected between the interior lead-in cables 18. The complete array 24 can be deployed outwardly to a selected distance behind vessel 10 by further paying out tow cables 14 and lead-in cables 18, and paravanes 16 can be operated to maintain the desired position of array 24 under tow.

Tow speed of vessel 10 can vary typically between two and four knots, however other speeds outside of this range are possible. Latch mechanism 34 can be relatively simply because the drag forces under tow will normally move tag lines 26 away from vessel 10 and into contact with tether heads 32 in normal operation. For this reason, tether heads 32 may comprise a simple variation, larger or smaller, in the diameter of tow line 14 or of lead-in cables 18, and latch mechanism 34 can comprise any device, shape or configuration sufficient to restrict movement of tag line 26 beyond a selected position on the adjacent tow cable 14 or lead-in cables 18. Engagement between latch mechanism 34 and tether head 32 can be remotely engaged or disengaged with wireless or hard wire controllers (not shown), or can simply operate through physical manipulation of lead-in cables 18. The engagement between latch mechanism 34 and tether head 32 does not require physical connection but preferably is sufficiently secure to resist relative movement during vessel turns, currents, and other array 24 movement or normal environmental forces.

Additional latch mechanisms 34 and connected tag lines 26 and associated lead-in cables 18 can be added or deleted without requiring simultaneous deployment or retrieval of all lead-in cables 18 and associated seismic streamer cables 22. If three or more lead-in cables 18 are positioned within seismic array 24, a middle lead-in cable can be deployed or retrieved by selectively engaging or disengaging latch mechanisms 34 associated with tag lines 26 connecting adjacent lead-in cables 18.

With a lockable latch mechanism 34 as provided by the invention, any of the inside or cables 18 can be deployed or retrieved without moving outer cables 18 or paravanes 16. After an outside cable or cables 18 are in position, the next inside cable 18 can be deployed. In various embodiments of the invention, it is possible to first deploy an interior lead-in cable 18 before an exterior lead-in cable 18 is deployed. Under such circumstances, latch mechanism 34 can be slidably engaged to move longitudinally relative to the relatively stationary lead-in cable 18. Although deployment of cables 18 is demonstrated from the outside of the array in to minimize cable 18 entanglement, other sequences can be implemented with selected maneuvers of vessel 10 and associated equipment.

Sensor 36 can detect and indicate engagement or other contact between latch mechanism 34 and tether head 32. Sensor 36 can be linked through hard wire or wireless techniques with a controller (not shown) on board vessel 10. GPS equipment (not shown) can be attached to selected locations within array 24 to provide position information regarding array 24 under tow. Sensor 36 can also monitor strain within lead-in cables 18 or tag lines 26 to observe potential failure points during vessel 10 manuevers. Such information can be used to vary operation of paravanes 16 and to determine when replacement of a lead-in cable 18 or tag line 26 may be appropriate.

In other embodiments of the invention, the "stationary" lead-in cable 18 does not have to be fully deployed before the associated latch mechanism 34, tag line 26, and adjacent lead-in cable 18 are deployed. This embodiment of the invention provides that multiple lead-in cables 18 can be simultaneously or sequentially deployed in different overlapping or non-overlapping time intervals to save overall vessel time. The invention uniquely permits sequential deployment of lead-in cables 18, which may be desirable in rough seas or high cross currents to prevent entanglement of lead-in cables 18, or also permits simultaneously deployment of the entire seismic array 24, with the flexibility to remove a single lead-in cable from the deployed array 24. Maximum deployment and retrieval is achieved, leading to reduced manpower requirements and overall vessel operating efficiency.

The invention permits movement of each latch mechanism 34 along each lead-in cable 18 without damage. Attachment of each latch mechanism 34 to a tether head 32 secures the relative position of each lead-in cable 18 and permits full towing forces to be transferred to move streamers 22 through water 12. Each latch mechanism 34 can be released from the corresponding tether head 32 to permit retrieval of lead-in cable 18. by monitoring and controlling the tension within each lead-in cable 18, system snags can be prevented and differential movement of adjacent streamers 22 under tow can be restricted.

The method of the invention comprises the step of attaching a divertor to a first cable having an end engaged with the tow vessel and having a latch attached to the first cable, of deploying the divertor and first cable into the water, of engaging the first end of a tag line to the first cable, wherein the tag line has a second end connected with a second cable, of deploying the tag line and second cable into the water, wherein said tag line first end is slidable along the first cable, of adjusting the length of the second cable until the tag line first end contacts the latch, and of moving the tow vessel to pull the divertor and first and second cables through the water.

In another embodiment of the invention, the method can comprise the steps of attaching a second divertor to a third cable connected to a second latch, of attaching a first end of a second tag line in sliding engagement with the third cable, of deploying the second divertor and the third cable into the water, of deploying the second tag line and an attached fourth cable into the water until the second tag line first end contacts the second latch, of connecting a third tag line between the second and fourth cables to form a seismic array between the first and second and third and fourth cables, and of moving the vessel through the water so that the first and second divertors maintain uniform spacing between the cables.

The invention maintains spacing and configuration integrity of array 24 during vessel 10 turns and maneuvers and in the presence of waves, wind and cross-currents. When vessel 10 reaches the survey boundary and turns around, greater stresses will be exerted on outer lead-in cables 18 compared with interior lead-in cables 18, and the flexibility of the invention permits such vessel 10 manuevers without requiring additional manipulation of system components. Similarly, stopping and start-up of vessel 10 does not negatively impact the operation of the system. Upon failure of a latch mechanism 34, the entire array 24 can be retrieved from water 12 without losing any efficiency over existing deployment and retrieval systems.

The invention provides another unique advantage over conventional systems because less strain is placed on deployment and retrieval equipment (not shown) located on vessel 10. By deploying and retrieving one lead-in cable 18 and attached streamer 22 at a time instead of the entire array 22, less water induced drag is acting on the vessel 10 equipment, and less strain is imparted to a component within the system. This feature of the invention reduces equipment wear and increases operating safety for personnel on board vessel 10.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A system for deploying at least two seismic streamers behind a tow vessel movable in a selected course through water, comprising:

a first cable having a first end attachable to a first seismic streamer and having a second end engaged with the vessel;

a second cable having a first end attachable to a second seismic streamer and having a second end engaged with the vessel;

a latch associated with said first cable;

a tag line having a first end and having a second end connected with said second cable, wherein said tag line first end is slidable along said first cable until said tag line first end contacts said latch; and a diverter connected to said first cable first end for urging the first seismic streamer to a position offset from the vessel course and for maintaining tension in said tag line for controlling the distance between the first seismic streamer and the second seismic streamer.

2. A system as recited in claim 1, wherein said latch is capable of locking said tag line first end.

3. A system as recited in claim 2, wherein said latch is capable of releasing said tag line first end to permit selective retrieval of said first cable onto the vessel while said second cable remains in the water.

4. A system as recited in claim 2, wherein said latch is capable of releasing said tag line first end to permit selective retrieval of said second cable onto the vessel while said first cable remains in the water.

5. A system as recited in claim 1, further comprising a second diverter connected to third and fourth cables with a second tag line, wherein said third and fourth cables are connected to third and fourth streamers respectively, and wherein said second diverter is capable of urging said third and fourth streamers in a direction opposite from the offset position of said first and second seismic streamers.

6. A system as recited in claim 1, wherein said first seismic streamer is integrated within said first cable and said second seismic streamer is integrated within said second cable.

7. A system as recited in claim 1, further comprising a float attached to said first cable.

8. A system as recited in claim 1, wherein said tag line is integrated within said first cable.

9. A system as recited in claim 1, wherein said tag line is integrated within said second cable.

10. A system as recited in claim 1, further comprising a sensor engaged with said latch for indicating contact between said tag line first end and said latch.

11. A method for deploying at least two seismic streamers behind a tow vessel movable in a selected course through water, comprising the steps of attaching a divertor to a first cable having an end engaged with the tow vessel and having a latch attached to said first cable;

deploying said divertor and first cable into the water;

engaging the first end of a tag line to said first cable, wherein said tag line has a second end connected with a second cable;

deploying said tag line and second cable into the water, wherein said tag line first end is slidable along said first cable; and adjusting the length of said second cable until said tag line first end contacts said latch; and moving the tow vessel to pull said divertor and first and second cables through the water.

12. A method as recited in claim 11, wherein movement of said divertor through the water causes said divertor to maintain tension in said tag line for controlling the distance between the first seismic streamer and the second seismic streamer.

13. A method as recited in claim 12, further comprising the step of operating said divertor to control the offset of said first and second cables from the path behind the tow vessel as the tow vessel moves through the water.

14. A method as recited in claim 11, further comprising the step of connecting said tag line first end to said latch.

15. A method as recited in claim 14, further comprising the step of detaching said tag line first end from said latch.

16. A method as recited in claim 11, further comprising the step of removing said second cable from the water while leaving said first cable in the water.

17. A method as recited in claim 11, further comprising the steps of attaching said first cable to a first streamer and of attaching said second cable to a second streamer before said first and second cables are deployed in the water.

18. A method as recited in claim 11, further comprising the step of operating a sensor to indicate contact between the tag line first end and the latch.

19. A method as recited in claim 11, further comprising the steps of attaching a second divertor to a third cable connected to a second latch, of attaching a first end of a second tag line in sliding engagement with said third cable, of deploying said second divertor and said third cable into the water, of deploying said second tag line and an attached fourth cable into the water until said second tag line first end contacts said second latch, of connecting a third tag line between said second and fourth cables to form a seismic array between said first and second and third and fourth cables, and of moving the vessel through the water so that said first and second divertors maintain uniform spacing between said cables.

* * * * *